UNITED STATES PATENT OFFICE.

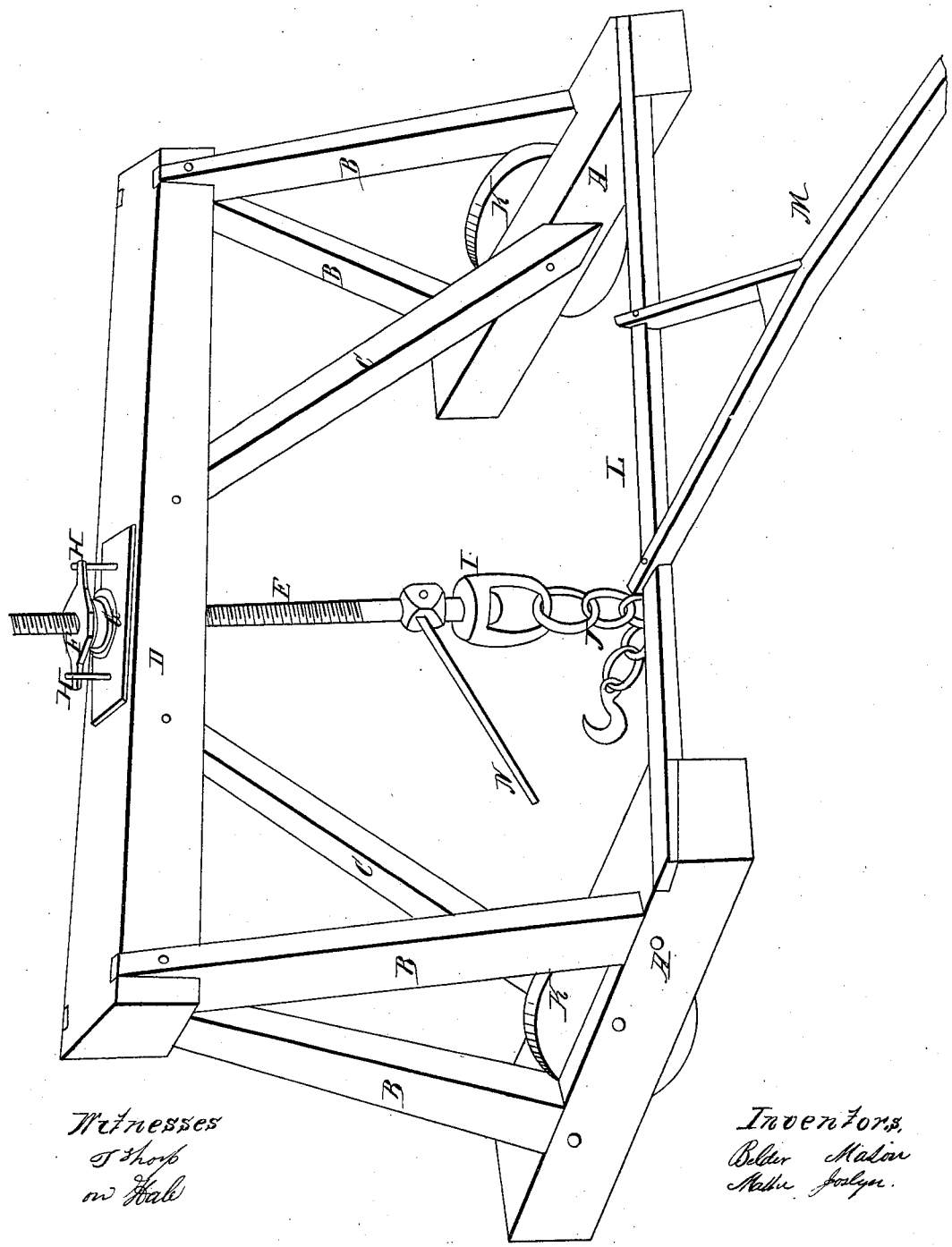

BELDIN B. MASON, OF RANDOLPH, AND MATHEWS JOSLYN, OF NAPOLI, NEW YORK.

STUMP-EXTRACTOR.

Specification of Letters Patent No. 1,989, dated February 20, 1841.

*To all whom it may concern:*

Be it known that we, BELDIN B. MASON, of Randolph, in the county of Cattaraugus and State of New York, and MATHEWS JOSLYN, of Napoli, in the county and State aforesaid, have invented a new and useful Machine for Extracting Stumps from Land; and we do hereby declare that the following is a full and exact description, to wit—

Our invention consists of a frame made of wood as follows: First, two sills about six feet in length are placed parallel and horizontally about fourteen feet asunder. At the distance of about eight inches from each end of each sill and on the top thereof a post of about eight feet in length is set and in such a manner as to enter a beam placed on the top of the same which beam reaches from sill to sill. In addition to the posts mentioned there are two other posts or braces which serve to support the beam one of which is set on the inside of each sill and intersects the beam on its under side about eighteen inches from its center. For the purpose of rendering the machine movable from place to place a hole is made through the center of each side of sufficient size and length to admit a wheel or roller about three feet in diameter. These wheels are so set in the sills that their peripheries extend about eight inches below the sills. The sills are also connected together by means of a cross piece or tie fastened to the end of the same. To the center of the cross piece is attached a tongue or pole to which a team of horses or cattle is applied for the purpose of moving the frame from place to place.

The power consists of a screw which hangs perpendicularly and passes through the center of the beam and enters a female screw or nut placed at the upper sill of the beam. The lower part of the nut is made in the form of a half globe which works in the socket fitted to it. The top of the nut is flat oblong and tapered at the ends. To prevent the nut from turning around two small posts or standards are set in the upper side of the beam so near each other that the ends of the upper side of the nut cannot pass between them thereby accommodating the lower end of the screw to a pendulous motion. To the lower end of the screw is attached a swivel to which is attached a chain which is fastened to the stump to be extracted. The screw is turned by means of a lever placed near the lower extremity. Constructing the nut or female screw in the manner described has a tendency to prevent the screw from bending or breaking. The dimensions of the screw are to be varied according to circumstances.

To use our machine we place it in such a manner that the lower end of the screw shall be directly over the edge of the top of the stump to be extracted, taking care to dig holes in the earth of sufficient size and depth to admit that part of the wheels or rollers which extends below the sills; then disengage the cross piece or tie from the frame; after making the chain fast to the stump, proceed to turn the screw by means of the lever until the stump is extracted.

We do not claim as our invention the method of extracting stumps by means of a screw passing through the nut in the upper part of the frame. As this has been before effected; but in that case the nut being permanently and immovably fixed to the frame, the screw was liable to be bent, and Therefore what we claim as our invention and as an improvement on such a machine is—

The employment of the semispherical nut and socket in combination with the screw and chain by which the stump is gripped for the purpose and in the manner specified above.

BELDIN B. MASON.
MATHEWS JOSLYN.

Witnesses:
JOSEPH E. WEEDEN,
JOHN M. HARVEY.